June 6, 1961  R. D. MILLER  2,987,323
VEHICLE WHEEL SAFETY SKID
Filed May 29, 1959
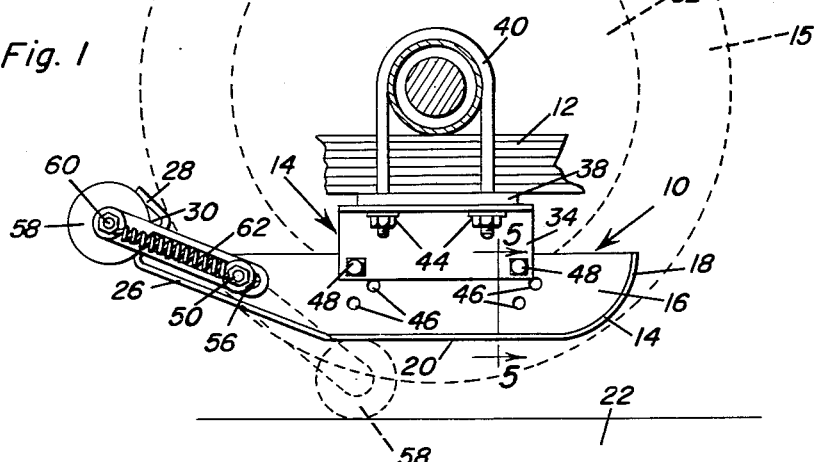
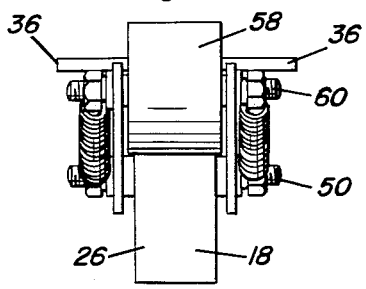
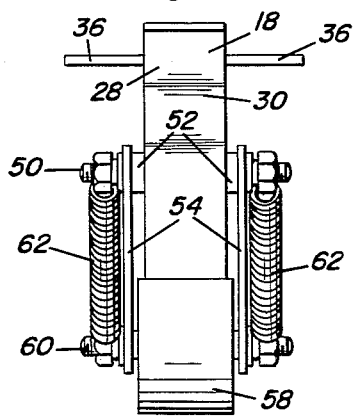
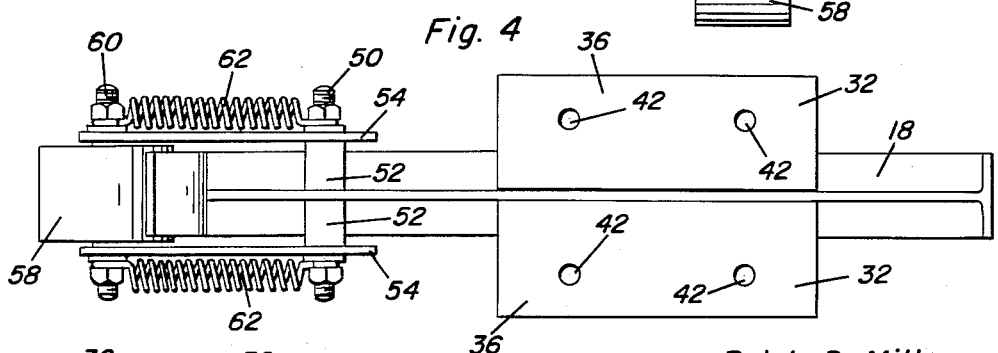
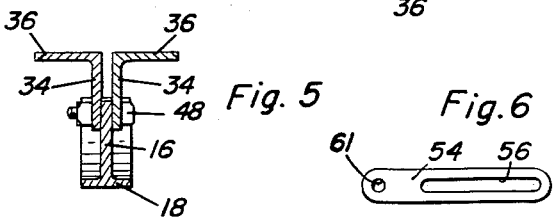
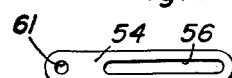
Ralph D. Miller
INVENTOR.

United States Patent Office 2,987,323
Patented June 6, 1961

2,987,323
VEHICLE WHEEL SAFETY SKID
Ralph D. Miller, El Cajon, Calif.
(301 Lakeland Drive, Hot Springs, Ark.)
Filed May 29, 1959, Ser. No. 816,748
8 Claims. (Cl. 280—150)

This invention relates to a novel and useful vehicle wheel safety skid and more particularly to a safety skid which is adapted to be secured to the suspension system of a vehicle wheel at a spaced distance above the ground surface so as to support that portion of the weight of the automobile normally supported by the adjacent wheel should the tire thereon become deflated.

When travelling in an automobile or other wheeled vehicles on highways at speeds within the present day speed limits, a blow-out can be extremely dangerous wherein the weight normally supported by a wheel is suddenly dropped upon the deflated tire casing in many instances can cause a driver to lose control of his vehicle. Many forms of safety tires, tubes and rims have in the past been designed to eliminate this danger of losing control as the result of a blow-out while travelling at high speeds. Evidenced by the disappearance of many of these safety devices from the selling market, many of these safety devices have had various drawbacks making them impractical or otherwise undesirable to the public.

The main object of this invention is to provide a vehicle wheel safety skid that may be secured to the suspension components of each wheel of a vehicle in such a manner as to be positioned to support that portion of the vehicle's weight normally supported by the adjacent wheel should the tire thereon become deflated.

A further object, in accordance with the preceding object, is to provide a vehicle wheel safety skid having a means adapting it to be secured to various vehicles having wheels of different diameters.

Still another object of this invention is to provide a vehicle wheel safety skid having a lifting member therefor adapted to engage the supporting surface therebeneath and lift the skid a sufficient amount to suspend the adjacent wheel above the ground upon movement of the vehicle in a reverse direction.

Yet another object, in accordance with the preceding objects, is to provide a means for retaining the lifting member in an inoperable position.

Still another object is to provide a lifting member with the vehicle wheel safety skid that may be moved from an operational position supporting the adjacent wheel above the supporting surface to an inoperational position upon movement of the vehicle in a forward direction.

A final object to be specifically enumerated herein is to provide a vehicle wheel safety skid that will conform to conventional forms of manufacture, be readily adaptable to substantially every type of wheeled vehicle and be of simple construction whereby to provide a device that will be economically feasible and beneficial to the owners of substantially every type of wheeled vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the invention shown mounted upon a conventional form of vehicle wheel suspension, parts of the latter being broken away, shown in section, and with the adjacent wheel shown in phantom lines;

FIGURE 2 is an end elevational view of the invention as seen from the left side of FIGURE 1 and with the roller in its raised or inoperative position;

FIGURE 3 is an end elevational view similar to that of FIGURE 2 but with the roller comprising the lifting member shown in its lowered or operational position;

FIGURE 4 is an enlarged top plan view of the invention as seen in FIGURE 1; and

FIGURE 5 is a transverse vertical sectional view taken substantially upon the plane indicated by the section line 5—5 of FIGURE 1.

FIGURE 6 is a side elevational view of one of the slotted elongated roller supports.

Referring now more specifically to the drawings the numeral 10 generally designates a safety skid comprising the instant invention which is shown mounted beneath a conventional form of leaf spring 12 by means of a mounting bracket generally referred to by the reference numeral 14 and in a position adjacent the vehicle wheel 15. The safety skid 10 comprises a substantially vertically disposed skid element 16 which extends longitudinally of the vehicle (not shown) having flanges 18 secured to its lower and opposite end surfaces extending longitudinally thereof and projecting laterally from both sides of the skid element 16. The skid element 16 has a flat, central lower surface 20 substantially parallel to the ground 22 which terminates in an upwardly curving portion 24 at its forward end and in an upwardly inclined generally straight portion 26 at its rear end. The upwardly inclined portion 26 in turn terminates in a V-shaped portion 28 spaced thereabove and forming a pocket 30, the purpose of which is to be hereinafter set forth.

The mounting bracket 14 comprises a pair of generally L-shaped mounting elements 32 each having a leg 34 which legs are positioned on opposite sides of the skid element 16 and are secured thereto with the other leg 36 of each element extending laterally therefrom and to one side of the skid element 16, the legs 36 being aligned with each other whereby to provide co-planar flat surfaces abutting against the underside of the retaining plate 38 which is secured beneath the spring 12 by means of U-bolts 40. Each of the legs 36 is suitably apertured as at 42 with the latter in alignment with and receiving therethrough the threaded ends of U-bolts 40 which encircle the wheel axle housing and are secured by means of nuts 44. Each of the legs 34 is provided with a pair of apertures (not shown) formed in the skid element and have secured therethrough suitable fasteners 48. It is to be understood that any selected pair of apertures 46 may be utilized to secure a skid element 16 to the mounting bracket 14 so as to correctly position the skid element 16 relative to the wheel 15, a plurality of sets of apertures being provided to effect this adjustment.

Pivotally secured to the skid element 16 adjacent the inclined portion 26 by means of pivot bolts 50 and spacers 52 are a pair of elongated supports 54, each of which is provided with a longitudinally extending slot 56. The pivot bolt 50 is passed through a suitable aperture (not shown) formed in the skid element 16 and the spacers 52 are slidably disposed within slot 56. The slot 56 terminates a spaced distance from the free end of the support members 56 and a roller 58 is rotatably journalled about axle pin 60 which is secured through a pair of aligned apertures 61, see FIGURE 6, formed through the free end portions of the support members 54. Secured between corresponding opposite ends of pivot bolt 50 and axle pin 60 are a pair of expansion springs 62 which resiliently urge the axle pin 60 toward the pivot bolt 50.

With attention drawn now more particularly to FIGURE 1, it will be noted that the roller 58 is shown within the pocket 30 with the pivot bolt 50 positioned in the end of the slot 56 remote from the axle pin 60. The expansion springs 62 resiliently urge the roller 58 towards pivot bolt 50 and retain the roller 58 seated within pocket 30 in an inoperative raised and retracted position.

In operation, should the wheel 15 become deflated, it will be noted that the skid surface 20 will thereby be lowered and positioned beneath the lowermost portion of the rim 64, and that this surface will support the entire load normally carried by the wheel 15 before the rim 64 can contact the ground.

If it is desired to change or repair the wheel 15, the roller 58 is manually removed or withdrawn against the bias of the springs 62 from the pocket 30 and positioned beneath the inclined surface 26 and above the ground 22. The spring 62 will urge the roller into frictional and wedging engagement with the inclined surface 26 and the ground 22 so that when the vehicle (not shown) or the skid 10 is moved in a rearward direction, the inclined surface 26 will roll over the upper portion of the roller 58 until the latter is positioned beneath the skid surface 20 as shown in phantom lines, see FIGURE 1.

When the roller 58 is positioned beneath the skid surface 20, the skid element 16 has been elevated a sufficient amount to raise the tire 15 above the ground 22 so that it may be removed and replaced with another wheel.

When it is desired to lower the new wheel into engagement with the ground 22, the skid 10 is moved in a forward direction with the vehicle (not shown) whereupon the skid portion 20 and the inclined portion 26 will roll over the roller 58 lowering the skid element and the wheel 15 until the latter engages the ground 22. After the weight of that portion of the vehicle has been transferred from the skid 10 to the wheel 15, the roller 58 may again be positioned within pocket 30.

Thus it can be seen that herein described is a vehicle wheel safety skid that is readily adaptable to substantially all types of wheeled vehicles and capable of supporting the load normally carried by a wheel should the latter become deflated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle wheel safety skid comprising a skid element and a mounting means connected thereto and adapting said element to be removably secured to the suspension system of a vehicle adjacent a wheel thereof with the lowermost surface of said skid a spaced distance above the surface supporting the inflated tire of the adjacent wheel and below the lowermost edge of said wheel so as to provide a skid surface to which the weight normally supported by said adjacent wheel and inflated tire will be transferred when the tire is deflated, a lifting member secured to said skid element, said skid element including a lower horizontal surface terminating at its rearward end in an upwardly inclined surface, said lifting member including a roller, means on said skid mounting said roller for rotation about an axis extending transversely of said skid element and for movement between an inoperational out-of-the-way position and an operational position disposed beneath said inclined surface adapted to engage said supporting surface to raise the skid element upon the operation of the vehicle in a reverse direction, whereby said inclined surface will roll over said roller to position said roller beneath said horizontal surface, raising said skid a sufficient amount above said supporting surface to also raise the adjacent tire above the supporting surface when it is inflated.

2. The combination of claim 1 including means adjustably positioning said skid element relative to said securing means.

3. The combination of claim 1 wherein the lower horizontal surface of said skid element terminates in an upwardly curving portion at its forward end.

4. A vehicle wheel safety skid comprising a skid element and a mounting means connected thereto and adapting said element to be removably secured to the suspension system of a vehicle adjacent a wheel thereof with the lowermost surface of said skid a spaced distance above the surface supporting the inflated tire of the adjacent wheel and below the lowermost edge of said wheel so as to provide a skid surface to which the weight normally supported by said adjacent wheel and inflated tire will be transferred when the tire is deflated, a lifting member secured to said skid element adapted to engage said supporting surface and engageable with a portion of said skid element to raise the latter upon the operation of the vehicle in a reverse direction, said lifting member raising said skid a sufficient amount above said supporting surface to also raise the adjacent tire above the supporting surface when it is inflated, said skid element having a lower surface with the skid portion substantially parallel with said supporting surface terminating in an upwardly inclined portion at its rear end, said lifting member comprising a roller, means mounting said roller for rotation about an axis extending transversely of said skid and for movement longitudinally thereof between an inoperational position above the upper end of said inclined portion to an operational position beneath said skid portion wherein when said roller is positioned between said supporting surface and said inclined portion and the skid is moved rearwardly said inclined portion will roll over said roller lifting said skid until said roller is beneath said skid portion.

5. The combination of claim 4 including means resiliently urging said roller toward an operational position.

6. The combination of claim 5 including means retaining said roller in an inoperational position.

7. A vehicle wheel safety skid comprising a skid element and a mounting means securing said element to the suspension system of a vehicle adjacent a wheel thereof with the lowermost surface of the skid element positioned between the peripheries of the wheel and of the tire immediately above the point of contact of the tire and the roadway, said lowermost surface of the skid element at the rear end being inclined upwardly and terminating in a receiving pocket, a skid lifting means comprising a rolling means on an axle transverse of the skid, means comprising links mounting said axle at one end and at their other ends being slidably and swingably mounted on said skid element inwardly of said pocket, and resilient means yieldingly retaining said rolling means seated in said pocket whereby upon failure of the tire and the vehicle being supported by said skid element, removal of the rolling means from the pocket and positioning thereof between the inclined end and the roadway will, upon backing up of the vehicle, cause the inclined end of the skid element to roll over the roller to elevate the wheel and tire above the roadway.

8. A vehicle wheel safety skid comprising a skid element and a mounting means securing said element to the suspension system of a vehicle adjacent a wheel thereof, with the lowermost surface of the skid a spaced distance above the surface supporting the inflated tire of the adjacent wheel, and below the lowermost edges of said wheel, said lowermost surface of said skid at the rear end being inclined upwardly and terminating in a recessed pocket facing rearwardly, a skid lifting means for raising the skid and the adjacent wheel and tire clear of the supporting surface; comprising a roller having an axle transverse of the skid, means comprising links mounting said axle at one end and at their other ends for sliding and swinging movement of said skid element inwardly of said pocket and resilient means yieldingly retaining said roller seated in said pocket whereby upon failure of a tire and the vehicle being supported by said skid, removal of the roller from the pocket and the positioning of the roller between the supporting surface and the inclined end of said skid will, upon backing up of the vehicle, move the inclined end of the skid over the roller to elevate the wheel and tire above the supporting surface.

References Cited in the file of this patent

UNITED STATES PATENTS

| | | |
|---|---|---|
| 2,014,459 | Woodruff | Sept. 17, 1935 |
| 2,439,758 | Sorrentino | Apr. 13, 1948 |
| 2,461,758 | Moss | Feb. 15, 1949 |